United States Patent [19]

Gyursanszky

[11] E Re. 31,146

Best Available Copy [45] Reissued Feb. 8, 1983

[54] TWO-WIRE BALLAST FOR FLUORESCENT TUBE DIMMING

[75] Inventor: Zoltan L. Gyursanszky, Don Mills, Canada

[73] Assignee: Honeywell Ltd., Canada

[21] Appl. No.: 239,709

[22] Filed: Mar. 2, 1981

Related U.S. Patent Documents

Reissue of:

[64] Patent No.: 4,163,925
Issued: Aug. 7, 1979
Appl. No.: 875,478
Filed: Feb. 6, 1978

[30] Foreign Application Priority Data

Apr. 21, 1977 [CA] Canada ..... 276641

[51] Int. Cl.[3] ..... H05B 41/38; H05B 41/20

[52] U.S. Cl. ..... 315/276; 315/106; 315/199; 315/258; 315/278; 315/283; 315/291; 315/DIG. 4

[58] Field of Search ..... 315/94, 97, 98, 105, 315/106, 194, 199, 254, 258, 276, 278, 279, 283, 291, DIG. 4

[56] References Cited

U.S. PATENT DOCUMENTS

| | | | |
|---|---|---|---|
| 2,458,277 | 1/1949 | Lark et al. | 315/284 |
| 3,167,683 | 1/1965 | Harpley | 315/DIG. 4 |
| 3,201,645 | 8/1965 | Strecker | 315/DIG. 4 |
| 3,222,573 | 12/1965 | Lord | 315/194 |
| 3,249,806 | 5/1966 | Genuit | 315/194 |
| 3,325,682 | 6/1967 | Elliot, Jr. | 315/97 |
| 3,422,309 | 1/1969 | Spira et al. | 315/194 |

FOREIGN PATENT DOCUMENTS 1284603 8/1972 United Kingdom .

*Primary Examiner*—Eugene R. LaRoche
*Attorney, Agent, or Firm*—Trevor B. Joike

[57] ABSTRACT

A two-wire ballast arrangement is disclosed for fluorescent tubes having first and second terminals for supplying variable power to dim the fluorescent tube, a choke coil connected between the first terminal and the fluorescent tube and a filament transformer having a primary connected between the second terminal and a tap on the choke coil, the tap being selected to supply substantially constant voltage to the primary winding, the transformer having secondary windings to supply filament voltage to the fluorescent tube.

14 Claims, 9 Drawing Figures

TWO-WIRE BALLAST FOR FLUORESCENT TUBE DIMMING

Matter enclosed in heavy brackets [ ] appears in the original patent but forms no part of this reissue specification; matter printed in italics indicates the additions made by reissue.

BACKGROUND OF THE INVENTION

This invention relates to a ballast arrangement for fluorescent tubes and particularly to a two-wire ballast arrangement to supply substantially constant filament voltage to a fluorescent tube supplied by a variable power source for dimming.

Typical fluorescent tubes comprise a sealed cylinder of glass having a heating filament at either end and filled with a gas such as mercury vapor. The filaments are heated by a supplied voltage to cause thermionic emission so that an arc can be struck across the tube causing the gas to radiate. The radiation given off by gases such as mercury is short-wave ultraviolet radiation and thus produces little visible light. In order to provide visible light, the inside of the tube is coated with a suitable phosphor which is activated by the ultraviolet radiation and emits visible light of a color that is characteristic of the particularly phosphor or mixture of phosphors employed to coat the tube. In order to sustain the arc across the tube, the filament voltage must be maintained to a predetermined level which poses a problem when the fluorescent tube is to be used in a light dimming arrangement.

As one answer to this problem, the prior art developed a three-wire system where the filament voltage was separated from the variable current used to dim the fluorescent tube. In such a system, a first wire was used to supply variable current to the fluorescent tube. A second wire was used to supply constant filament voltage to the filaments of the tube. The third wire was used as a return. From a cost of installation standpoint, a two-wire arrangement for dimming fluorescent tubes is preferable.

The prior art has developed two-wire fluorescent tube dimming arrangements but these provide only a limited dimming capability. The problem with the prior art two-wire dimming arrangements is that the filament voltage to the tube is varied as the dimming current supply to the fluorescent tube is varied. Thus, as the current supplied to the fluorescent tube is reduced to dim the tube, the filament voltage is also reduced resulting in stripping the emission-coating from the cathodes, and when the filament voltage has been reduced below the level to sustain the arc across the tube, the tube will extinguish. The present invention extends the dimming range of the tube by supplying substantially constant filament voltage to the tube in a two-wire system.

SUMMARY OF THE INVENTION

In the present invention, first and second terminals provide variable dimming power to the fluorescent tube, a choke coil is connected between the first terminal and the tube and a transformer is provided having a primary winding connected between the second terminal and a tap on the choke coils selected to provide substantially constant voltage to the primary winding even as the power to the tube is varied, the transformer further having secondary windings associated with the primary winding to supply filament voltage to the filaments of the tube.

BRIEF DESCRIPTION OF THE DRAWINGS

These and other features and advantages of the invention will become apparent from a detailed consideration of the invention when taken in conjunction with the drawings in which.

DETAILED DESCRIPTION

Figure 1:
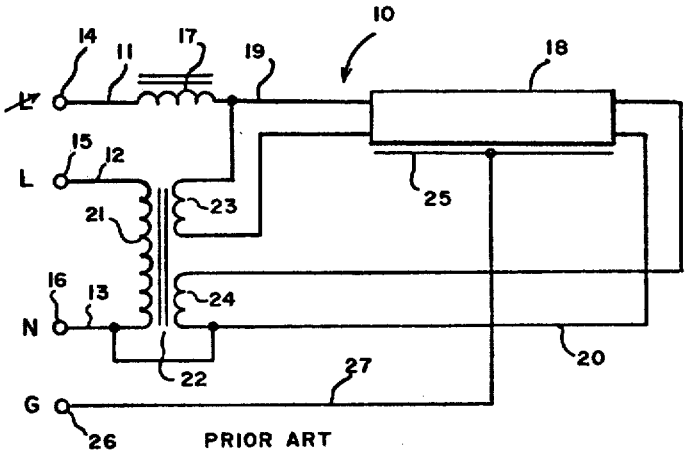
FIG. 1 shows a three-wire prior art arrangement for dimming a fluorescent tube.

The fluorescent dimming arrangement 10 shown in FIG. 1 is a three-wire system comprising wires 11, 12 and 13 connected to respective input terminals 14, 15 and 16. First wire 11 connects terminal 14 to choke coil 17 the other side of which is connected to fluorescent tube 18 by line 19. Line 20 connects the other side of tube 18 to terminal 16. Connected across terminals 15 and 16 is primary winding 21 of filament transformer 22. Terminal 14 supplies variable power or current to fluorescent tube 18 for dimming and transformer 22 connected to terminals 15 and 16 supplies constant filament voltage to fluorescent tube 18. Thus, secondaries 23 and 24 of transformer 22 are connected to respective filaments within fluorescent tube 18. The starting stripe 25 which is accomplished by the fixture is associated with fluorescent tube 18 and is connected to ground terminal 26 by line 27.

Since the filaments of the fluorescent tube must be maintained at their specified voltage to keep them at their temperature and to sustain an arc across the tube, the prior art recognized that a constant voltage source for the filaments of tube 18 was desirable to increase the range over which it could be dimmed as controlled by the variable power or current supplied by terminal 14. To this end, the prior art arrangement as shown in FIG. 1 comprised a separate filament voltage source (connected to terminals 15 and 16), not associated with the variable supply terminal 14, for supplying constant voltage to the tubes' filaments. However, this system is a three-wire system and the prior art has also recognized that a two-wire system would reduce the cost and complexity of installation. Thus, the prior art developed the type of system shown in FIG. 2.

Figure 2:
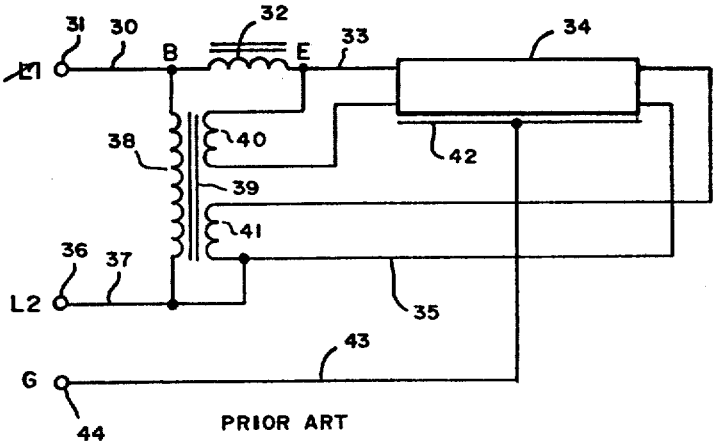
FIG. 2 shows a prior art two-wire arrangement for dimming a fluorescent tube.

In FIG. 2, first wire 30 connects variable current or power source terminal 31 to choke coil 32 the other side of which is connected by line 33 to fluorescent tube 34. The other side of tube 34 is connected by line 35 and by second wire 37 to second supply terminal 36. Connected between first wire 30 and second wire 37 is primary winding 38 of filament supply transformer 39. Transformer 39 has secondary winding 40 connected to one filament of tube 34 and second secondary winding 41 connected to the other filament of tube 34. The starting stripe 42 associated with tube 34 is connected by line 43 to ground terminal 44. This arrangement, although it reduces the cost and complexity of installation of a dimming system for controlling the intensity of a fluorescent tube, does not provide a system for supplying constant filament voltage to tube 34 and, therefore, the operating range for the dimming of tube 34 is very limited.

Figure 3:
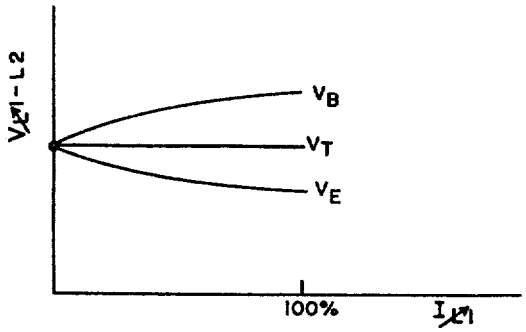
FIG. 3 shows the voltage vs. the controlled current through the tube for each side of the choke coil of FIG. 2 and for the tap on the choke coil of FIG. 4.

As can be seen from FIG. 3, as the current through the choke coil 32 is varied from 0% to 100% by variable supply terminal 31, the voltage at point B increases whereas the voltage at point E on the opposite side of the choke coil decreases due to the negative resistance behaviour of the tube. Thus, in the arrangement of FIG. 2, as the dimming current supplied to tube 34 decreases, the voltage supplied to the filaments of tube 34 also decreases.

In order to avoid the problems associated with the circuit of FIG. 2 but yet retain the advantages of a two-wire system, the present invention connects the primary winding of the filament supply transformer to a tap on the choke coil selected to give relatively constant voltage. In FIG. 3, the voltage $V_T$ represents the voltage at the tap of the choke coil which is selected to be connected to the primary of the filament supply transformer and is a constant or substantially constant voltage as the dimming current is varied.

Figure 4:
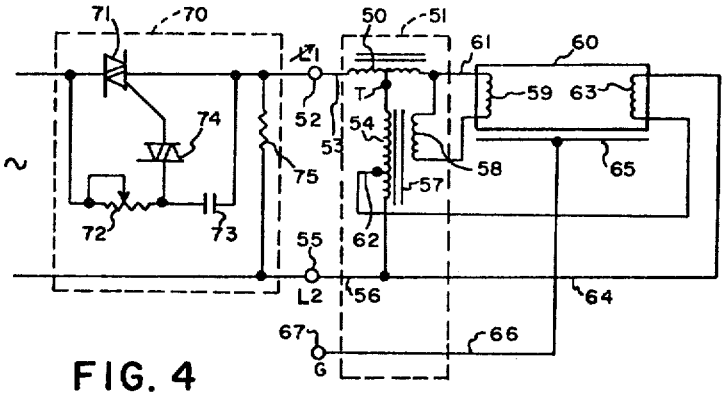
FIG. 4 shows the ballast arrangement according to the instant invention.

In FIG. 4, choke coil 50 of ballast 51 has a tap T selected to produce this substantially constant voltage. First wire 53 connects choke coil 50 to variable current or power supply terminal 52. Primary winding 54 is connected between tap T on choke 50 and second wire 56. Filament supply transformer 56 has secondary coil 58 connected across filament 59 of fluorescent tube 60. Filament 59 is also connected by line 61 to the other side of choke coil 50. A second secondary winding is comprised of tap 62 of primary winding 54 which tap is connected to one side of filament 63 of fluorescent tube 60. The other side of filament 63 is connected by line 64 and second wire 56 to terminal 55. Provision is made for starting stripe 65 connected by line 66 to ground terminal 67.

Since the voltage at tap T on choke coil 50 is substantially constant as the current therethrough varies, the filament transformer 57 will supply substantially constant voltage to filaments 59 and 63 of fluorescent tube 60. In this manner, the operating range of the fluorescent tube is greatly extended without decreasing its life since the filament voltage and emission temperature will be maintained through the whole dimming range.

In order to dim fluorescent tube 60, a dimming circuit 70 is provided connected between a source of alternating current and terminals 52 and 55. Dimming circuit 70 is comprised of a solid-state semiconductor switch or triac 71 having one side connected to one side of the alternating current source and the other side to terminal 52. Connected across triac 71 is a series combination of variable resistance 72 and capacitor 73. A diac 74 is connected from the junction of variable resistance 72 and capacitor 73 to the gate terminal of triac 71. Resistor 75 is connected from the junction of triac 71 and terminal 52 to the junction of the other side of the alternating current source and terminal 55. The dimming control circuit 70 is a phase control circuit which controls the amount of current supplied to terminal 52 by the setting of variable resistance 72.

Figure 5:
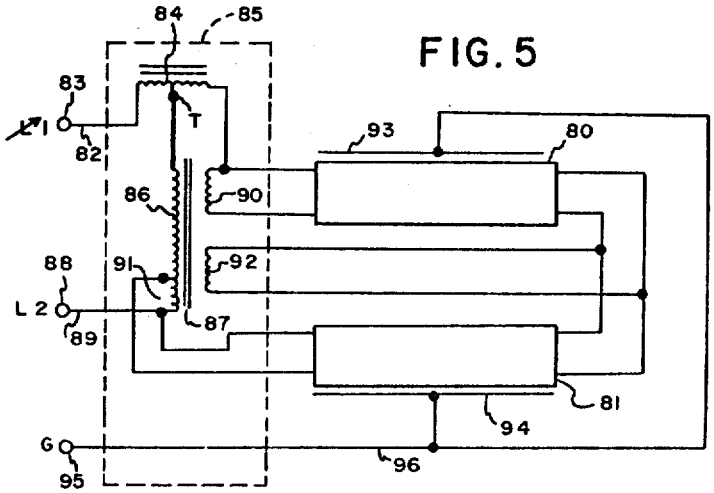
FIG. 5 shows an arrangement of the present ballast for supplying two fluorescent tubes.

FIG. 5 shows a variation of the circuit of FIG. 4 for supplying two fluorescent tubes 80 and 81. First wire 82 connects a variable power or current source terminal 83 to choke coil 84 of ballast 85. The other of the choke coil is connected to fluorescent tube 80. Primary winding 86 of filament supply transformer 87 is connected from tap T on choke coil 84 to second supply terminal 88 by second wire 89. Filament supply transformer 87 has first secondary winding 90 connected to a first filament of fluorescent tube 80, a second secondary winding 91, comprised of a tap on primary winding 86, connected to a first filament of fluorescent tube 81 and a third secondary 92 connected to the second filament of both fluorescent tubes 80 and 81. The starting stripe 93 associated with fluorescent tube 80 and starting stripe 94 associated with fluorescent tube 81 are connected to ground terminal 95 by line 96. Since tap T is selected as the substantially constant voltage point on choke coil 84, secondary windings 90, 91 and 92 will supply substantially constant filament voltage to fluorescent tubes 80 and 81.

Figure 6:
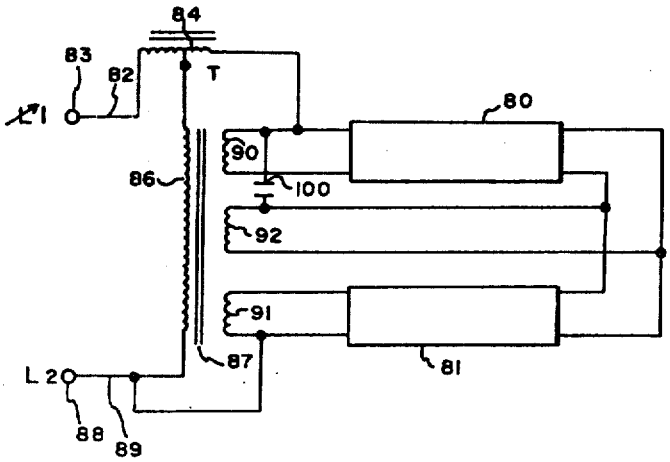
FIG. 6 shows an alternative ballast arrangement for supplying two tubes according to the instant invention.

The system in FIG. 6 is substantially similar to the circuit of FIG. 5 and, therefore, like elements have been assigned like reference numerals. The primary difference between these two circuits is that instead of secondary winding 91 of FIG. 5 being comprised of a tap on primary winding 86, a separate secondary winding 91′ associated with transformer 87 is provided for the first filament of fluorescent tube 81. Also, a small, start-aid capacitor 100 is connected from the top of secondary winding 90 to the top of secondary winding 92.

Figure 7:
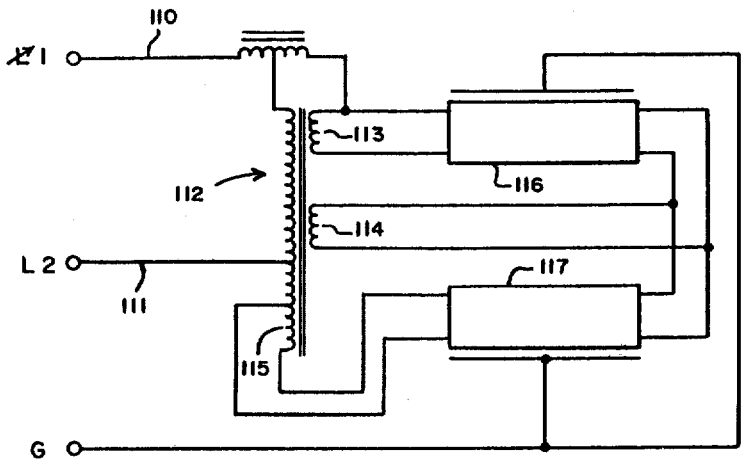
FIG. 7 is another variation for two-wire control.

Finally, the system of FIG. 7 is designed to operate from low voltage (e.g. 200–277 volts) two-wire supply mains 110 and 111. The step-up auto transformer 112 provides high voltage (e.g. 347 voltage) thereacross for supplying filament heating voltage to secondaries 113, 114 and 115 for tubes 116 and 117.

Figure 8:
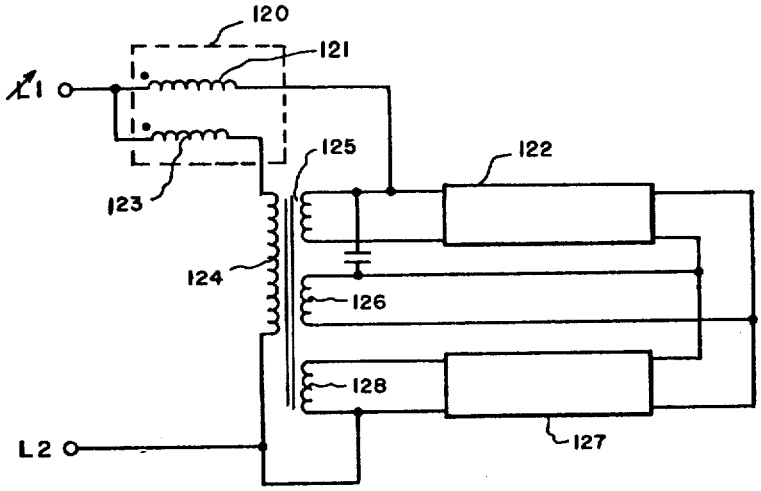
FIGS. 8 and 9 show alternative ballast arrangements according to the instant invention.
Figure 9:
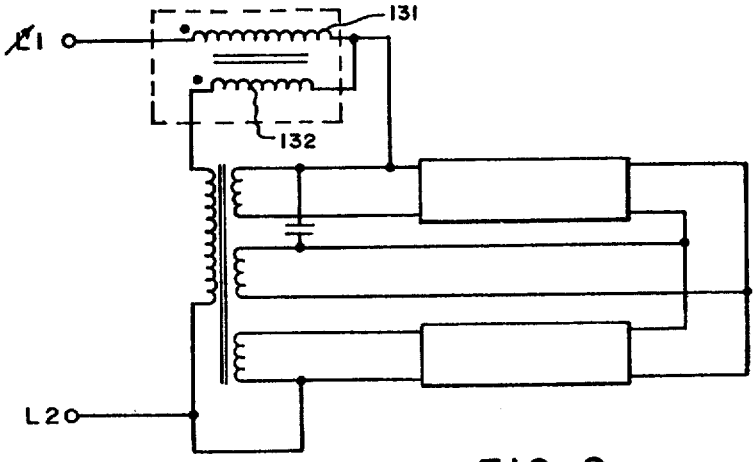

The arrangements shown in FIGS. 8 and 9 include a choke coil arrangement which is equivalent to the tapped choke coil arrangements shown in FIGS. 4–7. Specifically, a choke coil transformer 120 has a first winding 121 connected between terminal L1 and fluorescent tube 122. Second winding 123 of the transformer 120 is connected between terminal L1 and one side of primary winding 124, of transformer 150, the other side of which is connected to terminal L2. One filament of fluoresecent tube 122 is supplied with filament voltage from primary winding 124 by way of secondary winding 125 whereas the second filament of fluorescent tube 122 is supplied by secondary winding 126 of transformer 150. One filament of fluorescent tube 127 is supplied with voltage from secondary winding 126 and the other filament is supplied by secondary winding 128 of transformer 150. The lower lead of secondary winding 128 is connected to terminal L2.

By way of example, if the winding 84 shown in FIG. 6 has a total of 2,000 turns with 500 turns on the left side of the tap and 1,500 turns on the right side of the tap, then winding 121 will have a total of 2,000 turns and winding 123 will have 500 turns. In this manner, the number of turns between windings 121 and 123 are selected, as is the tap in FIG. 6, to provide a constant filament voltage by way of primary winding 124 and secondary windings 125, 126 and 128.

In FIG. 9, the choke coil transformer 130 is essentially the same as choke coil transformer 120 of FIG. 8 except that the second winding 132 of transformer 130 is connected to the right side of first winding 131 instead of to the left side.

Thus, if winding 123 should have 500 turns when winding 121 has 2,000 turns, winding 132 of FIG. 9 should have 1,500 turns when winding 131 has 2,000 turns. Thus, the number of turns that the second winding of the choke coil transformer has is dependent not only upon the number of turns of the first winding but also upon the side of the first winding to which the second winding is connected. Grounding stripes may be provided as are shown in FIGS. 5 and 7 where necessary.

The embodiments of the invention in which an exclusive property or right is claimed are defined as follows:

1. A ballast for a fluorescent tube dimming arrangement comprising:

first and second terminals adapted to be connected to a source of variable power;

an inductive coil connected to said first terminal and adapted to be connected to a fluorescent tube; and, a transformer having a primary winding, said primary winding having a first end connected to a tap on said inductive coil selected so that, as the power supplied to said fluorescent tube is varied for dimming, the voltage across said primary winding remains substantially constant, and a second end connected to said second terminal, said transformer further having first and second secondary windings for supplying filament voltage to said fluorescent tube.

2. The ballast of claim 1 wherein said transformer comprises a third secondary filament heating winding for supplying a second fluorescent tube with variable dimming power.

3. A two-wire ballast system for a fluorescent tube dimming arrangement comprising:

first and second terminals for supplying variable dimming power to said fluorescent tube;

first connecting means including a choke coil connecting said first terminal to a first side of said fluorescent tube;

second connecting means connecting a second side of said fluorescent tube to said second terminal; and, constant filament voltage supply means connected [between said first connecting means and said second connecting means and connected to said filaments of said fluorescent tube] *to a tap on said choke coil selected so that, as the power supply to said fluorescent tube is varied for dimming, the voltage supplied by said constant filament voltage supply means remains substantially constant, said constant filament voltage supply means connected to said second terminal and having output means* for supplying constant filament voltage [thereto] *to said fluorescent tube.*

4. The two-wire ballast system of claim 3 wherein said constant filament voltage supply means comprises a transformer having a primary winding, said primary winding having a first end connected to a tap on said choke coil selected so that, as the power supply to said fluorescent tube is varied for dimming, the voltage across the primary winding will remain substantially constant, and a second end connected to said second terminal, said transformer further having first and second secondary windings for supplying filament voltage to said fluorescent tube.

5. The two-wire ballast system of claim 4 wherein said first secondary winding comprises a separate winding magnetically coupled to said primary winding and connected to a first filament of said fluorescent tube and said second secondary winding comprising a tap on said primary winding and a second filament of said fluorescent tube connected across said tap on said primary winding and said second terminal.

6. The two-wire ballast system of claim 5 further comprising a grounded starting stripe associated with said fluorescent tube.

7. The two-wire ballast system of claim 4 further comprising a second fluorescent tube and wherein said transformer comprises a third secondary winding, said fluorescent tube and said second fluorescent tube each having first and second filaments, said first secondary winding connected t said first filament of said fluorescent tube, said third primary winding connected to said first filament of said second fluorescent tube and said second secondary winding connected to said second filaments of said fluorescent tube and said second fluorescent tube.

8. The two-wire ballast system of claim 7 wherein said first secondary winding comprises a separate winding magnetically coupled to said transformer, said second winding comprises a separate winding magnetically coupled to said transformer and said third secondary winding comprises a tap on said primary winding.

9. The two-wire ballast system of claim 8 comprising a first grounded starting stripe associated with said fluorescent tube and a second grounded starting stripe associated with said second fluorescent tube.

10. The two-wire ballast system of claim 7 wherein said first secondary winding comprises a separate winding magnetically coupled to said primary winding, said second winding comprising a separate winding magnetically coupled to said primary winding and said third secondary winding comprising a separate winding magnetically coupled to said primary winding.

11. The two-wire ballast system of claim 10 comprising a first grounded starting stripe associated with said fluorescent tube and a second grounded starting stripe associated with said second fluorescent tube.

12. The two-wire ballast system of claim 3 further comprising a dimming control circuit connected between a source of alternating current and said first and second terminals.

13. The two-wire ballast system of claim 2 wherein said transformer is a step-up auto transformer.

14. The two-wire ballast system of claim 13 wherein said auto transformer has a first secondary winding connected to a first filament of a first tube, a second secondary connected to a first filament of a second tube, and a third secondary winding connected to second filaments of said first and second tube.

[15. The two-wire ballast of claim 3 wherein said constant filament voltage supply means comprises a secondary coil having a first end connected to one side of said choke coil and a second end connected to said filament of said fluorescent tube whereby the number of turns of said choke coil and said secondary coil are chosen so that said filament supply circuit will supply substantially constant voltage to said filament.]

[16. The two-wire ballast of claim 15 wherein said choke coil has a first end connected to said first terminal and a second end connected to said fluorescent tube and wherein said first end of said secondary winding is connected to said first end of said choke coil.]

[17. The two-wire ballast of claim 16 wherein said filament supply circuit comprises a primary winding connected between said second end of said secondary winding and said second terminal and having a first secondary winding connected to one filament of said fluorescent tube and a second secondary winding connected to a second filament of said fluorescent tube.]

[18. The two-wire ballast of claim 15 wherein said choke coil has a first end connected to said first terminal and a second end connected to said fluorescent tube and wherein said secondary coil has a first end connected to said second end of said choke coil and wherein said filament supply circuit comprises a primary winding connected between said second end of said secondary coil and said second terminal, said primary winding having a first secondary winding associated therewith connected to a first filament of said fluorescent tube and a second secondary winding associated therewith connected to a second filament of said fluorescent tube.]

* * * * *